(12) United States Patent
Gould

(10) Patent No.: US 7,954,306 B2
(45) Date of Patent: Jun. 7, 2011

(54) GREASE MASKING PACKAGING MATERIALS AND METHODS THEREOF

(75) Inventor: Richard J. Gould, St. Paul, MN (US)

(73) Assignee: Rock-Tenn Shared Services, LLC, Norcross, GA (US)

(*) Notice: Subject to any disclaimer, the term of this patent is extended or adjusted under 35 U.S.C. 154(b) by 0 days.

(21) Appl. No.: 12/409,073

(22) Filed: Mar. 23, 2009

(65) Prior Publication Data

US 2009/0255624 A1    Oct. 15, 2009

Related U.S. Application Data

(62) Division of application No. 09/896,552, filed on Jun. 29, 2001, now abandoned.

(60) Provisional application No. 60/298,868, filed on Jun. 15, 2001, provisional application No. 60/258,686, filed on Dec. 28, 2000.

(51) Int. Cl.
*B65B 11/58* (2006.01)
*C09D 11/06* (2006.01)

(52) U.S. Cl. .......... 53/452; 53/411; 106/31.13
(58) Field of Classification Search .......... 53/411, 53/452; 106/31.13
See application file for complete search history.

(56) References Cited

U.S. PATENT DOCUMENTS

| | | | |
|---|---|---|---|
| 3,196,038 A | 7/1965 | Schoch et al. | |
| 3,463,659 A | 8/1969 | Kraske et al. | |
| 3,637,431 A * | 1/1972 | Brenneman et al. | 428/318.4 |
| 3,671,472 A * | 6/1972 | McNamee et al. | 524/53 |
| 3,714,104 A * | 1/1973 | Bergomi, Jr. | 524/521 |
| 3,873,345 A | 3/1975 | Vreeland | |
| 3,950,290 A * | 4/1976 | Drury et al. | 524/276 |
| 4,003,311 A | 1/1977 | Bardin | |
| 4,048,736 A | 9/1977 | Castleman et al. | |
| 4,239,822 A * | 12/1980 | McGee | 427/358 |
| 4,265,969 A | 5/1981 | Yasuda et al. | |
| 4,343,858 A | 8/1982 | Thompson | |
| 4,375,989 A | 3/1983 | Makinen | |
| 4,391,833 A | 7/1983 | Self et al. | |
| 4,455,184 A | 6/1984 | Thompson | |
| 4,521,492 A | 6/1985 | Allen | |
| 4,568,574 A | 2/1986 | Allen | |
| 4,587,154 A | 5/1986 | Hotchkiss et al. | |
| 4,753,710 A | 6/1988 | Langley | |
| 4,913,773 A | 4/1990 | Knudsen et al. | |

(Continued)

FOREIGN PATENT DOCUMENTS

CA     2358764     4/2002

(Continued)

OTHER PUBLICATIONS

Brochure entitled Georgia's Kaolin Industry the Employment, Economic, & Environmental Impact, 06 pages http://www/georgiamining.org/Kaolin/kaolin.htm (Oct. 28, 2003).

(Continued)

*Primary Examiner* — Rinaldi I Rada
*Assistant Examiner* — Gloria R Weeks
(74) *Attorney, Agent, or Firm* — Kilpatrick Townsend & Stockton LLP

(57) ABSTRACT

The present invention relates generally to the packaging materials. More specifically, the invention relates to materials and methods suitable for use as packaging materials whereby the appearance of grease, fat or oil staining on the packaging material is reduced or eliminated.

6 Claims, 3 Drawing Sheets

U.S. PATENT DOCUMENTS

| | | | |
|---|---|---|---|
| 4,933,212 A | | 6/1990 | Gerstner et al. |
| 5,029,521 A | | 7/1991 | Pay et al. |
| 5,037,682 A | | 8/1991 | Gerstner et al. |
| 5,075,153 A | * | 12/1991 | Malhotra ............... 428/207 |
| 5,091,236 A | | 2/1992 | Keller et al. |
| 5,104,449 A | * | 4/1992 | Pavlin ............... 524/251 |
| 5,143,546 A | | 9/1992 | Yuasa et al. |
| 5,169,496 A | | 12/1992 | Wagle et al. |
| 5,302,249 A | * | 4/1994 | Malhotra et al. ............. 162/135 |
| 5,362,812 A | * | 11/1994 | Holmes et al. .............. 525/274 |
| 5,837,383 A | | 11/1998 | Wenzel et al. |
| 5,928,741 A | | 7/1999 | Andersen et al. |
| 5,989,696 A | | 11/1999 | McCarthy et al. |
| 6,207,242 B1 | | 3/2001 | Hoffman |
| 6,284,034 B1 | | 9/2001 | Hiorns et al. |
| 6,387,500 B1 | | 5/2002 | Behl |
| 6,669,814 B2 | | 12/2003 | Hansen et al. |
| 6,680,103 B1 | | 1/2004 | Sloat et al. |
| 6,740,373 B1 | * | 5/2004 | Swoboda et al. ............. 428/34.2 |
| 6,858,252 B2 | | 2/2005 | Sloat et al. |
| 2002/0114933 A1 | | 8/2002 | Gould |
| 2004/0101661 A1 | | 5/2004 | Sloat et al. |
| 2005/0158524 A1 | | 7/2005 | Sloat et al. |

FOREIGN PATENT DOCUMENTS

| | | | |
|---|---|---|---|
| DE | 1461247 B | | 1/1970 |
| EP | 0313356 A | | 4/1989 |
| JP | 54050575 | | 4/1979 |

OTHER PUBLICATIONS

Abstract of JP04080745 published Mar. 13, 1992, XP-002195634.
Office Action dated Oct. 2, 2002 in parent U.S. Appl. No. 09/896,552.
Response dated Nov. 4, 2002 in parent U.S. Appl. No. 09/896,552.
Office Action dated Jan. 30, 2003 in parent U.S. Appl. No. 09/896,552.
Response dated Apr. 29, 2003 in parent U.S. Appl. No. 09/896,552.
Office Action dated Jul. 16, 2003 in parent U.S. Appl. No. 09/896,552.
Office Action dated Aug. 4, 2003 in parent U.S. Appl. No. 09/896,552.
Response dated Feb. 17, 2004 in parent U.S. Appl. No. 09/896,552.
Office Action dated Jul. 15, 2004 in parent U.S. Appl. No. 09/896,552.
Response dated Nov. 8, 2004 in parent U.S. Appl. No. 09/896,552.
Response dated Dec. 8, 2004 in parent U.S. Appl. No. 09/896,552.
Office Action dated Dec. 22, 2004 in parent U.S. Appl. No. 09/896,552.
Response dated Jan. 6, 2005 in parent U.S. Appl. No. 09/896,552.
Office Action dated Apr. 7, 2005 in parent U.S. Appl. No. 09/896,552.
Response dated Jun. 7, 2005 in parent U.S. Appl. No. 09/896,552.
Office Action dated Aug. 25, 2005 in parent U.S. Appl. No. 09/896,552.
Response dated Mar. 2, 2006 in parent U.S. Appl. No. 09/896,552.
Office Action dated May 25, 2006 in parent U.S. Appl. No. 09/896,552.
Notice of Appeal filed Nov. 27, 2006 in parent U.S. Appl. No. 09/896,552.
Response dated Jul. 2, 2007 in parent U.S. Appl. No. 09/896,552.
Office Action dated Sep. 20, 2007 in parent U.S. Appl. No. 09/896,552.
Response dated Mar. 20, 2008 in parent U.S. Appl. No. 09/896,552.
Office Action dated Jul. 22, 2008 in parent U.S. Appl. No. 09/896,552.
Notice of Appeal filed Jan. 22, 2009 in parent U.S. Appl. No. 09/896,552.

* cited by examiner

GREASE MASKING PACKAGING MATERIALS AND METHODS THEREOF

CROSS-REFERENCE TO RELATED APPLICATIONS

This application is a divisional application of U.S. patent application Ser. No. 09/896,552 filed Jun. 29, 2001, pending, which claims priority to U.S. Provisional Application No. 60/298,868, filed Jun. 15, 2001, and also claims priority to U.S. Provisional Application No. 60/258,686, filed Dec. 28, 2000, abandoned. The disclosures of each of these applications are incorporated herein by reference in their entireties.

FIELD OF THE INVENTION

The present invention relates generally to packaging materials. More specifically, the invention relates to materials suitable for use as packaging materials, whereby the appearance of grease, fat or oil staining on the packaging material is reduced or eliminated.

BACKGROUND OF THE INVENTION

Packaging materials, such as paperboard, paper or fabric are frequently utilized to package grease, fat or oil-containing materials. For example, human and animal foodstuffs commonly include a significant amount of grease, fat or oil. During filling, transport or storage, the grease, fat or oil from the foodstuff can migrate from the food product to the packaging material, thereby resulting in unsightly stains on the outer surface of the packaging material. Also, grease, fat or oil-containing materials may come into contact with the outer surface of the packaging material to cause staining. While this migration of grease, fat or oil does not normally effect the structural integrity of the packaging material, the consumer generally dislikes the stained container and may be less likely to purchase a product because of such staining.

One solution to the problem of grease, fat or oil staining on a packaging material is to place the material to be packaged within an separate impermeable container within the packaging material itself such as, for example, a plastic bag. While such a method normally prevents grease, fat or oil staining in the packaging material prior to use by the consumer of the packaged material, this method has less effectiveness when the package has been opened and returned to the consumer's shelf for storage. For example, grease, fat or oil-containing crackers may be placed in a plastic bag within a packaging material. Grease, fat or oil will be contained within the bag as long as the bag remains closed. However, once opened, it is quite common for a consumer to drop one or more crackers between the bag and the inner surface of the packaging material when removing the crackers for use. If there is no bather material between the outer surface of the plastic bag, it is likely that grease, fat or oil will migrate from the cracker into and through the packaging material, thereby resulting in an unsightly stain on the outer surface of the packaging material. Stains on packaging material may also be caused by filling line debris or puncturing of the plastic bag.

Stains on the packaging material may also be caused by contact by a grease, fat or oil-containing material with the outer surface of the packaging material. Such stains may be from contact of the package with a grease, fat or oil stain on another package or by contact with grease, fat or oil-containing substances that may occur during filling, transport or storage.

Furthermore, it will be understood that, irrespective of the origin of a grease, fat or oil stain, extended times and elevated temperatures will normally exacerbate the appearance of such stains.

Whether or not a plastic bag is placed within the packaging material, in the past, it has been common to treat the packaging material with a barrier material effective to reduce the possibility that grease, fat or oil will migrate into and through the packaging material to cause a visible stain on the outer surface of the packaging material. The most common barrier materials from the standpoint of cost and effectiveness have been those of the fluorochemical variety i.e., Scotchguard® products, made by the 3M Company of Minneapolis, Minn. These materials have generally been applied to the packaging material prior to formation into, for example, a box. However, due to environmental and health concerns, 3M's fluorochemical barrier products have recently been removed entirely from the market. While other barrier materials exist, many otherwise effective methods are either not acceptable as the sole method of protection for use in certain applications or are applied from solvent-based systems. Moreover, for some of the more useful methods, the methods may be prohibitively expensive and/or not effective enough for many applications. Thus, the removal of 3M's fluorochemical barrier products from use has left a major void in the packaging materials market.

U.S. Pat. No. 4,521,492 discloses a method of masking the appearance of grease, fat or oil staining on a paperboard packaging substrate by first applying a non-leafing metallic ink over the substrate, followed by the application of a highly pigmented white outer layer. It is stated that the presence of the metallic ink alters the refractive index of the grease, fat or oil stained substrate and the over-coating with the highly pigmented white outer layer reduces or eliminates the metallic appearance of the lower ink layer. While effective for the masking of grease, fat or oil permeation, this method has at least two significant disadvantages. First, this material requires application of at least the non-leafing metallic ink layer using explosion-proof equipment because the non-leafing metallic ink is delivered from a solvent-based system. Second, the method requires the use of solvent recovery systems. These greatly increase the cost of utilizing this prior art grease masking system because the method cannot be used with existing mill equipment without resulting in difficulties. Further, the method of U.S. Pat. No. 4,521,492 has limited applications to printing press methods which reduces the usefulness of the process in printing processes requiring a multiple of print stations.

Against the above, it would be highly desirable to develop a method whereby the appearance of grease, fat or oil staining on a packaging material could be masked so that even if grease, fat or oil staining does occur, such stains will be less noticeable. Specifically, it would be desirable to be able to mask the appearance of grease, fat or oil staining on a packaging material whereby the materials utilized do not comprise non-leafing metallic inks Further, it would be desirable to apply such masking methods by way of aqueous systems, thereby allowing the use of standard mill equipment.

SUMMARY OF THE INVENTION

In accordance with the purpose(s) of this invention, as embodied and broadly described herein, this invention, in one aspect, relates to a packaging material comprising a substrate suitable for use as a packaging material wherein the appearance of grease, fat or oil on the substrate is masked by the selection of the color and, optionally, composition of one or more colored layers proximally disposed on an outer surface of the substrate, wherein the substrate may itself be colored. In a further aspect, methods of making and using the previously described packaging materials are provided.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
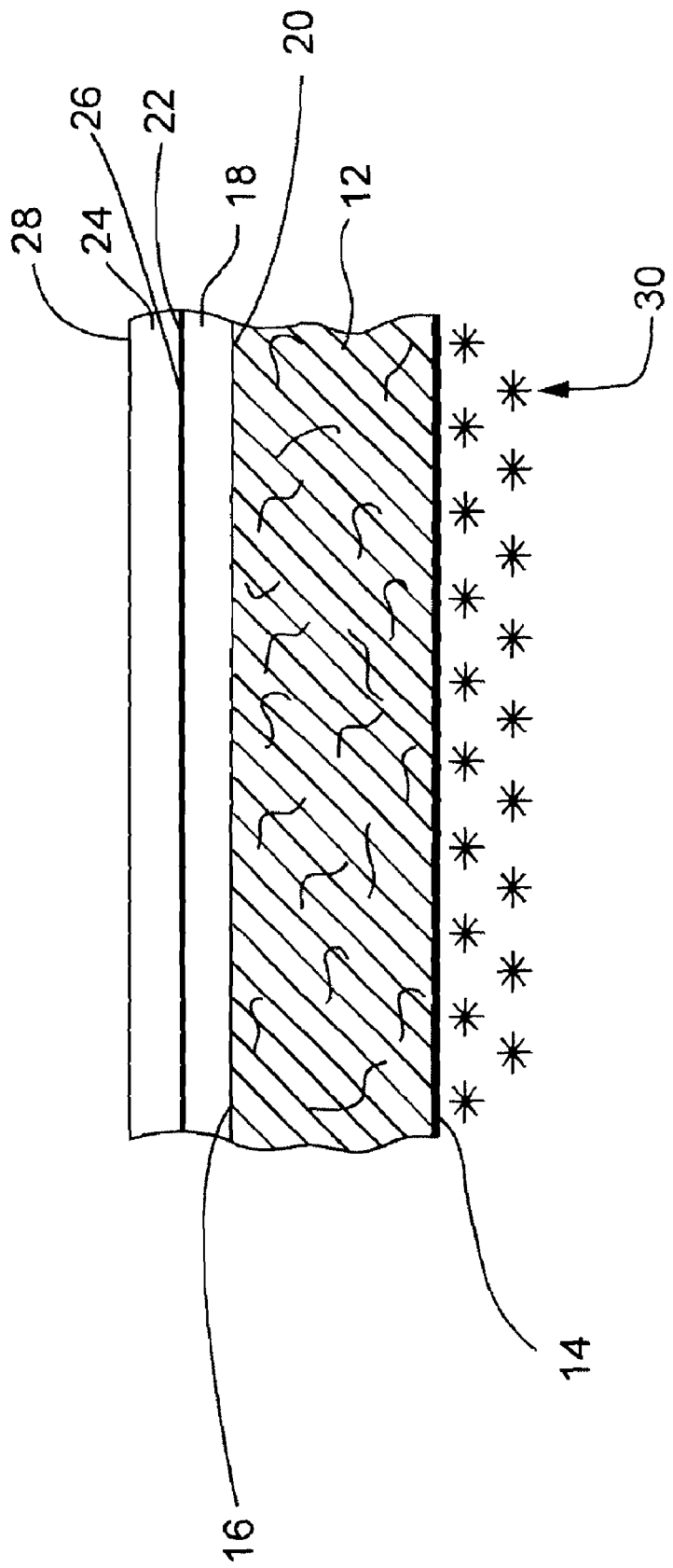
FIG. 1 is an illustration of a coated substrate with a dark colored layer and light colored layer disposed proximally thereto.

Before the present compounds, compositions, articles, devices, and/or methods are disclosed and described, it is to be understood that this invention is not limited to specific methods of making or applying the masking compositions herein, or specific compositions thereof, and, as such, may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a colorant" includes mixtures of colorants.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims that follow, reference will be made to a number of terms which shall be defined to have the following meanings:

"Colorant" means any substance that imparts color to another substance or mixture. As meant herein, white and black are colors. This definition of colorant also includes, but is not limited to pigments, dyes, whiting, barytes, clays and talc.

"Substrate color" means the color of the substrate e.g., paperboard, paper or fabric or other material without any added colorant and prior to the addition of the dark colored layer or the light colored layer. When a colorant is directly added to one or more plys of the substrate as described hereinbelow, the substrate color will be different from uncolored paperboard. For example, when recycled paperboard is the substrate, the substrate color will generally be light brown prior to the addition, if any, of colorant to one or more plys of the paperboard.

"Light colored" as utilized to describe either a layer or a colorant means having a value of from about 50 to about 95 on the Cielab scale. In further separate aspects, the light colored layer may be from about 55 to about 95 or from about 60 to about 95, or from about 65 to about 95, or from about 75 to about 95, or from about 80 to about 95, all such values being measured on the Cielab scale.

"Dark colored" as utilized to describe either a layer or a colorant means having a value of from about 0 to about 75 on the Cielab scale. In further separate aspects, the dark colored layer may be from about 0 to about 65, or from about 0 to about 55, or from about 0 to about 45, or from about 0 to about 40, or from about 0 to about 35, or from about 0 to about 30, or from about 0 to about 25, or from about 0 to about 20, or from about 0 to about 15, such values being measured on the Cielab scale.

As utilized herein, "dark colored" is defined in reference to a corresponding "light colored layer" and vice versa. That is, a dark colored layer (or substrate) is always darker in color that the light colored layer that will be applied over the dark colored layer (or substrate) when these two colored aspects combine to form the masking aspect of the present invention. In one or more aspects, it is possible that a dark colored layer (or substrate) utilized with one substrate may be lighter in color than the light colored layer utilized on a different substrate.

"Aqueous" means that the system comprises about 92% by weight or above of water. Such systems are considered to be essentially solvent free.

"Proximal" means that the referenced aspect or object is near to but not necessarily touching the aspect or object to which the word "proximal" refers. "Adjacent to" means the aspect or object is touching the aspect or object to which the phrase "adjacent to" refers.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound. However, compositions such as those disclosed and claimed herein may also be described by one of ordinary skill in the art as containing "parts" of a component. For example, a composition containing 100 parts pigment and 22 parts binder would comprise 82% pigment (100/100+22) and 18% binder (22/22+100). Such nomenclature is not used to describe and claim the invention herein.

A weight percent of a component, unless specifically stated to the contrary, is based on the total dry weight percent of the formulation or composition in which the component is included.

As utilized herein, "packaging material" means a material that may be used to make an article suitable for performing one or more of the following functions: a) containment for handling, transportation and use; b) preservation and protection of the contents for required shelf and use life and sometimes protection of the external environment from any hazards of contact with the contents; c) identification of contents, quantity, quality and manufacturer; and d) facilitation of dispensing and use. Non-limiting examples of the packaging material article include a wrap, pouch, bag, box, cup, tray, plate, can, tube, bottle or other container form.

By the term "effective amount" of a compound or property as provided herein it is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Referring first to the drawings, FIG. 1 is an illustration of one aspect of the present invention. A substrate 12 having an inner substrate surface 14 and an outer substrate surface 16 is coated with a dark colored layer 18 having an inner dark colored surface 20 and an outer dark colored surface 22 such that the dark colored layer is disposed proximal to outer substrate surface 16. A light colored layer 24 having an inner light colored surface 26 and an outer light colored surface 28 is disposed proximally to outer dark colored surface 22. A packaged good 30 may be present and may or may not be in contact with the inner substrate surface 14.

Figure 2:
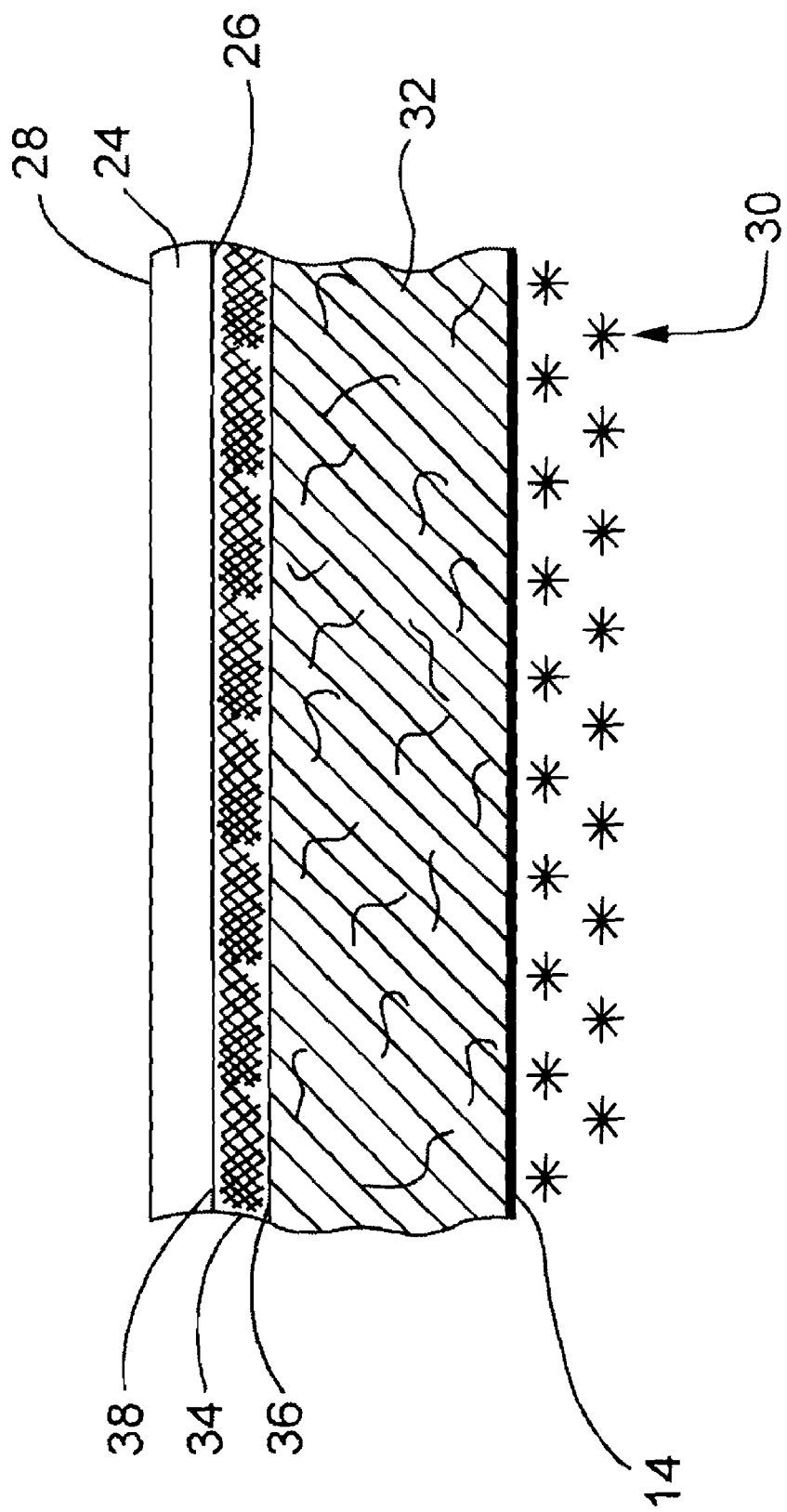
FIG. 2 is an illustration of a substrate in which the outer surface is dark colored and the substrate has a light colored layer disposed proximally thereto.

FIG. 2 illustrates a further aspect of the present invention wherein the substrate 32 has an integrated dark colored portion 34 having an inner dark colored surface 36 and an outer dark colored surface 38. The light colored layer 24 may then be disposed proximally to the outer dark colored surface 38.

Figure 3:
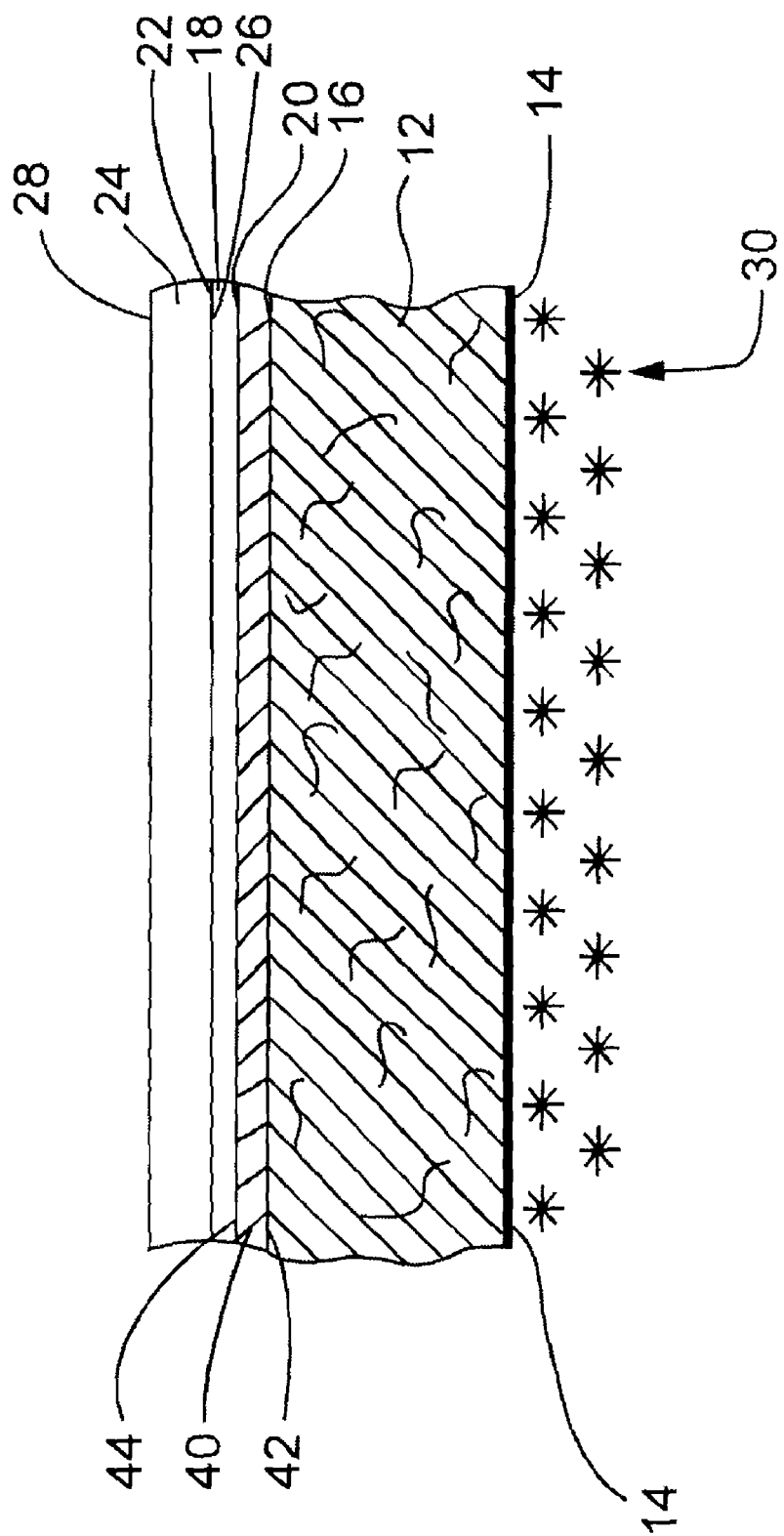
FIG. 3 is an illustration of a substrate with a precoat layer adjacent thereto and with a dark colored and light colored layer disposed proximally to the precoat treated substrate.

FIG. 3 illustrates a further aspect of the present invention wherein the substrate 12 has a precoat layer 40 having an inner precoat surface 42 and an outer precoat surface 44 disposed proximally to outer substrate surface 16 and inner dark colored surface 20.

Now referring to a first major aspect of the present invention, the invention provides a material for packaging grease, fat or oil-containing substances, wherein the packaging material comprises: a grease, fat or oil permeable substrate suitable for use as a packaging material, wherein the substrate has an inner and an outer surface; a dark colored layer having an inner and outer surface disposed proximal to the outer surface of the substrate, wherein the dark colored layer comprises a dark colorant; and a light colored layer having an inner and an outer surface disposed proximal to an outer surface of the dark colored layer, wherein the light colored layer comprises a light colorant; wherein the dark and light colored layers are selected to mask the appearance of grease, fat or oil staining on the packaging material, and wherein neither the dark colored layer nor the light colored layer comprises a non-leafing metallic ink. By "non-leafing metallic ink," it is meant the inks disclosed in U.S. Pat. No. 4,521,492, the disclosure of which is incorporated herein in its entirety by this reference. In a still further aspect, the colorants of the invention herein do not comprise a metallic material. For example, the colorants of the invention herein do not comprise an aluminum-containing colorant. Yet still further, the colorants of the present invention consist essentially of a non-leafing metallic ink.

A grease, fat or oil-containing material can be packaged in the packaging material. Upon storage, grease, fat or oil from the packaged material may come in contact with the inner surface of the substrate such that grease, fat or oil may migrate through the substrate to be visible on an untreated outer surface of the substrate. Also, grease, fat or oil may come into contact with the outer surface of a packaging material during filling or storage of the packaging material. It has been discovered that with the present invention, the appearance of such grease stains may be reduced or eliminated. As meant herein, "reduced" or "eliminated" are terms that will be relative to the specific application. For example, in a particular aspect, grease, fat or oil staining may be totally "eliminated" when the package has a useful life of only several weeks, whereas, grease, fat or oil staining may be "reduced" in the same treated substrate if the useful life of the package is several months. This is due to the fact that the present invention generally does not result in the formation of an impermeable barrier on a packaging material. Rather, it is believed that through a combination of optical phenomena and formulation selection, the surprising and unexpected masking properties of the present invention are obtained.

In a further aspect, the dark colorant may comprise one or more of: carbon black, raw sienna, burnt sienna, burnt umber, chrome black, high purity furnace black, black azo dyes or brown azo dyes. In a still further aspect, the dark colorant comprises carbon black. While such masking many not be permanent in most circumstances, the duration and extent of masking is sufficient for packaging materials uses.

In a further aspect, the light colorant comprises one or more of: titanium dioxide, calcium carbonate, calcium silicate, calcium sulfate, barium sulfate, natural clay, a synthetic clay, magnesium oxide, magnesium silicate, zinc carbonate, zinc oxide and plastic pigment. A titanium dioxide product particularly suitable for use in the invention herein is Huntsman R-BC Slurry, a product of Huntsman Trioxide, Salt Lake City, Utah. Clays suitable for use in the invention herein include, but are not limited to, kaolin (grades 1, 2 etc.), delaminated clay and structured clay. Kaolin clays particularly suited for the invention herein include Kaoprint and Kaobrite, products of Thiele, Sandersville, Ga. In a further aspect, the colorant does not comprise calcium carbonate. In a further aspect, the light colorant does not comprise calcium carbonate.

In a further aspect, the dark colorant may be optionally applied from a dark colorant-containing solution. It should be noted that the dark colorant-containing solution may normally contain additional materials, including other colorants. These additional materials may comprise materials such as titanium dioxide, which, in addition to being a white colorant, may also act as an opacifier. Thus, when opacity is desirable in the dark colored layer, titanium dioxide can be included along with the dark colorant. A further additional material in the dark colored layer, as well as in the light colored layer, may comprise clay or calcium carbonate, which, in addition to being white colorants, may also act as extenders or opacifiers, whereby the amount of colorant to be utilized in the solution may be reduced or eliminated. Thus, it is contemplated according to the invention herein, that the dark colorant-containing solution may also contain materials that are referred to elsewhere herein or otherwise known as "light colorants" or that are otherwise generally known to one of ordinary skill in the art as "colorants." Thus, when utilized in conjunction with the dark colorant herein, the purpose of these materials is for a reason other than for conferring color, however, some color may nonetheless be conferred by use of such materials.

In a significant aspect, the materials utilized in one or more of the dark or light colored layers or to color one or more plys of the substrate itself may be suitable for use in food, drug or cosmetic applications. Such materials are specifically described in Title 21 of the United States Code. More particularly, the colorants that may be suitable for use in the invention herein are described in Title 21, Section 178.3297 of the United States Code. The disclosures of all referenced United States Code sections are herein incorporated in their entireties by this reference. Other materials, whether colorants or otherwise, may be suitable for use in food, drug and cosmetic applications that are not specifically delineated in the United States Code, particularly materials that may be available outside of the U.S. and are suitable for use therein. As such, it is contemplated herein that materials not specifically set forth in the United States Code may be utilized in the present invention.

One of ordinary skill in the art may further understand that other non-food, drug or cosmetic approved colorants or other ingredients may be utilized in accordance with the invention herein according to the intended end-use for the packaging material, as long as such colorants are not those utilized in non-leafing metallic inks. For example, if the material to be packaged is a grease, fat or oil-containing pesticide, it will not be necessary for the materials utilized on the surface of the packaging substrate to be acceptable for food, drug or cosmetic applications. Further, even where the material to be packaged is food, drug or cosmetic material, a wide range of additional colorants may be utilized where such materials are acceptable for such applications.

In one aspect, the dark colored layer may be applied from a dark colorant-containing solution, wherein the dark colorant-containing solution comprises from about 0.01 to about 20.0% by weight of the dark colorant as measured by total weight of the solution. Still further, the dark colorant-containing solution comprises from about 0.25 to about 4.0% by weight of the dark colorant as measured by total weight of the solution. Yet still further, the dark colorant may be present in the dark colorant-containing solution at from about 0.01, 0.1, 0.25, 0.5, 1.0, 1.5, 2.0, 2.5, 3.0, 3.5, 4.0, 4.5, 5.0, 5.5, 6.0, 6.5, 7.0, 7.5, 8.0, 10.0, 12.0, 14.0, 16.0, 18.0 and 20.0% by weight of the dark-colorant-containing solution, where any of these stated amounts may comprise either the upper or lower endpoint of the range of dark colorant therein and any lower endpoint can be used with any upper endpoint.

In a further aspect, the light colored layer may be applied from a light colorant-containing solution, wherein the light colorant-containing solution comprises from about 30 to about 90% by weight of the light colorant as measured by total weight of the solution. Still further, the light colored layer may be applied from a light colorant-containing solution, wherein the light colorant-containing solution comprises from about 40 to about 80% by weight of the light colorant as measured by total weight of the solution. Yet still further, the light colorant may be present in the light colorant-containing solution at from about 1, 5, 10, 25, 30, 35, 40, 45, 50, 55, 60, 65, 70, 75, 80, 85, 90, 95 and 99% by weight of the light colorant-containing solution, where any of these stated amounts may comprise either the upper or lower endpoint of the range of light colorant therein and any lower value can be used with any upper value.

In a significant further aspect, either or both of the colored layers may be applied from respective light or dark colorant-containing solutions, wherein either or both solutions may be aqueous. By having aqueous systems as defined previously, standard paper mill equipment may be readily utilized to prepare packaging materials according to the invention herein. This provides significant advantages in the present invention over the methods disclosed in U.S. Pat. No. 4,521,492.

In one or more aspects of the present invention, the dark colored layer may not be separately applied to the substrate. If no dark colored layer is separately applied, the substrate itself may have a substrate color that is darker than the light colored layer. In such an aspect, the substrate color is modified to be darker than the uncolored (natural) substrate. For example, a dark color can be added to one or more layers (or plys) in a single or multi-ply paperboard by means of a colorant addition step during the paper manufacturing process so that the entire substrate (in a single ply product) or the outer surface of the paperboard (in a multi-ply product) is darker than that of uncolored substrate. In one aspect, a multi-ply paperboard article may be manufactured whereby the pulp comprising one or more outer plys, for example, the top liner, is treated with a dark colorant to result in a dark colored outer surface for the substrate. In separate aspects, the number of plys in the paperboard (whether colored or uncolored) is two, three, four, five, six, seven, eight, nine or ten, in which one or more outer plys may be colored with a dark colorant according to the present invention. Such dyes or colorants may be present in a pulp slurry in a range of from about 0.1 to about 3.0% by weight. Such colorants may in the form of azo dyes wherein the individual colors may be used alone or mixed with other azo dyes to form a dark color in one or more plys of the paperboard. In a further aspect, the entire paperboard product may be dark colored by the addition of azo dyes to a pulp slurry in the amounts of from about 0.1 to about 3.0% by weight.

Methods of making paperboard products are not crucial to the invention herein and are well known generally to one of ordinary skill in the art. Specific examples of methods that may be utilized herein are described generally in U.S. Pat. Nos. 4,753,710, 4,913,773 and 5,169,496, the disclosures of which are each incorporated herein in their entireties by this reference.

As contemplated herein, the specific shade of dark colorant or light colorant is not crucial to the invention. However, as noted, the "dark" colorant should provide a color to the substrate that is darker than that provided by the "light" colorant to the light colored layer and vice versa.

In one aspect, the light colored layer may be white and the dark colored layer may be black or gray. In further aspects, the light colored layer may be yellow, pink, pale green, pale blue, etc.; that is, the light colored layer may be any color that exhibits a significant reflectance of light. The dark colored layer may be blue, purple, brown, etc.; that is, the dark colored layer may be any color that exhibits a significant absorbance of light. Definitions of "light colored" and "dark colored" are as previously set forth herein.

While not wishing to be bound by theory, it is believed that by selecting an outer substrate color that is closer in color to that of a grease, fat or oil stain, the appearance of a grease, fat or oil stain on the outer surface of the packaging material will be lessened, reduced or eliminated. That is, it is hypothesized by normalizing the background color of the packaging material to a shade similar to the grease, fat or oil, the refractive index of the packaging substrate may be altered so that a grease, fat or oil stain may be less visible in the finished packaging material. Further, selection of the light colored layer will be dependent on a number of factors including the degree of darkness of the dark colored layer and the desired whiteness/brightness of the outer layer.

It should be noted that a very dark colored layer itself will likely be effective to mask a wide variety of grease, fat or oil stains or a substrate. However, one of ordinary skill in the art will recognize that such a dark layer will be difficult to cover with a light-colored over layer without having a very thick layer and/or having a large amount of opacifying pigments, such as $TiO_2$. However, according to the method and compositions of the present invention, it is possible to mask grease, fat or oil staining by means of selection of the dark colored and light color layers to provide cost effective packaging materials.

Accordingly, when a light colored layer is selected and applied over the dark colored substrate or the dark colored layer, the masking may be effectuated by the application of the light colored outer layer. In accordance with the present invention, and in some aspects in conjunction with binder materials (as discussed in more detail below), it is believed that this optical phenomenon is augmented and enhanced in a surprising and unexpected manner.

In the selection of the colors so as to mask the appearance of grease, fat or oil permeation (e.g. staining) in a packaging material, the relative thickness of the colored layers, the concentration of colorants in the coatings, the type of grease, fat or oil-containing material being packaged and the time and the temperature to which the package is subjected will each be relevant. For example, when the grease masking capability of a packaging material need only be apparent for a short time, such as with a fast food container in which the packaged material may be consumed shortly after purchase, a dark color may not need to be as dark and a light color may not need to be as light relative to each other because the grease masking necessity for the package is relatively short-lived. In contrast, when packaging a food product where the storage capability needs to be longer, the dark color and/or the light color may need to have a greater masking ability. Moreover, the degree of a grease, fat or oil stain will also be related to the type of material being stored in the packaging material. However, in accordance with the disclosure herein and the general knowledge in the art, one of ordinary skill in the art will be able to determine the relative amounts of ingredients, thickness of coatings, etc. useful for particular applications without undue experimentation.

In a still further aspect, the packaging material may have a TAPPI brightness number of from about 50, 55, 60, 65, 70, 75, 80, 85, 90, 95, 99 or 100, where any of these referenced measurements may comprise either the upper or lower endpoint and any of these lower endpoints may be used with any of these higher endpoints. In a further aspect, the packaging material may have a TAPPI brightness number of from about 60 to about 90. Still further, in another aspect, the packaging material has a TAPPI brightness number of greater than 75. The brightness of the packaging materials are measured according to TAPPI method T452 om-83. This TAPPI method is incorporated herein in its entirety by this reference.

In a further major aspect, the grease, fat or oil permeable substrate utilized according to the compositions and methods herein comprises paperboard, paper or fabric. However, one of ordinary skill in the art will recognize that the substrates in which this invention may be utilized are not limited to these specifically enumerated substrates. Rather, it is contemplated according to the invention herein "substrate" includes any article that customarily or feasibly could be coated with a coating formulation or that may itself be dark colored and may be coated with the light colored layers described herein. In separate aspects, the substrate must be suitable for use as a packaging material as the term is defined elsewhere herein.

Still further, in another aspect, the grease, fat or oil permeable substrate may comprise paperboard. The paperboard so utilized can specifically comprise one or more of: SBS ("solid bleached sulfate"), SUS ("solid unbleached sulfate") or recycled paperboard.

SUS (for example, Omnicoat® or Pearlcoat®, Riverwood, Marietta, Ga.) utilized according to the methods herein may be comprised of primarily southern pine species such as the Loblolly as a fiber source, although some hardwood fiber may be used, particularly in one or more outer plys. Some recovered paper may also be added as a fiber source, which may account for about 20% of the fiber (although this amount will vary based on market conditions and other factors). SUS is generally a brown-colored paperboard which can then be coated according to the methods herein with application of a dark colored layer proximal to the SUS and a light colored proximal to the dark colored layer. Additionally, one or more outer plys of the SUS may be colored to result in a one or more dark colored outer plys on the paperboard.

When recycled paperboard (for example ClassicNews®, Rock-Term Company, Norcross, Ga.) is utilized in the compositions and methods herein, a variety of types of recovered paper and paperboard may be utilized. Each source may have an impact on the final substrate and, accordingly, the packaging applications to which the packaging material is suited. Two of the predominant fibers utilized in recycled paperboard sources may be old newspapers (ONP) and old corrugated containers (OCC). ONP normally add bulk and can improve formation but may not convey as much strength as OCC. Another common fiber source may be office waste paper (OWP) which has high value when utilized as an outer (top) ply to provide a clean, smooth printing surface for the coated recycled paperboard. This outer ply may be made dark colored according to the methods of the invention herein. Recycled clippings from printing and converting plants also can provide a large fiber source for the recycled coated paperboard industry.

SBS (for example, from Westvaco, Covington, Va.) that may be utilized according to the methods and compositions herein generally comprises bleached fiber from both softwood and hardwood trees, although there normally is a higher percentage of hardwood fiber therein. The percentage of hardwood fiber can vary significantly without affecting its use in the invention herein, but, typically, the hardwood content may be greater than about 80%. SBS utilized according to the methods herein may also contain some recycled fibers. When matted into paperboard according to known papermaking procedures, hardwood fibers generally form a smooth white sheet. As such, without treatment with the grease masking method herein, the appearance of grease, fat or oil staining on this SBS substrate will be marked.

In a significant aspect, the packaging material prepared according to the invention herein may be suitable for use in packaging food, drugs or cosmetics. More particularly, the packaging material may be suitable for use in packaging human food or animal food.

In addition to paperboard as described above, the substrate may be paper or fabric. If the substrate is paper or fabric or some other suitable substrate, it will be understood that the substrate itself may be dark colored or a separate dark colored outer layer may be applied to accomplish the objectives of the present invention. When paper, the packaging material may be in the form of a single layer or in a multi-ply bag. Application of the dark and light colored layers to both paper and fabric materials is in accordance to the methods disclosed herein with respect to paperboard. To the extent that the application methods may differ, such differences will be minimal and one of ordinary skill in the art will recognize the same.

In a further aspect, the colorant-containing solutions from which one or more of the dark colored layers and the light colored layers are applied each, independently, comprise one or more of: water, dispersant, resin, surfactant, wetting agent, defoamer, thickener, starch, preservative, or antioxidant. Such additional materials may be included in the colorant-containing solutions according to methods known generally to one of ordinary skill in the art. Non-exclusive examples of coating formulations that may be utilized in accordance with the invention herein are disclosed generally in U.S. Pat. No. 5,837,383, the disclosure of which is incorporated herein in its entirety by this reference.

Furthermore, there may be a layer on the outer surface of the grease, fat or oil-permeable substrate, wherein the layer comprises one or more of: starch, polyvinyl alcohol, or one or more sizing agents that would be recognizable by one of ordinary skill in the art. When starch is utilized in the present invention, the starch may be catatonically modified to augment the affinity of the precoat to the substrate that, if comprised of paper or paperboard, may carry a net anionic charge. Still further, in another aspect, the layer may comprise a dye, pigment or other type of colorant, and, as such, this layer may operate as the dark colored layer. This layer, whether colored or not, may or may not comprise binder.

Still further, in another aspect, a printed layer may be present adjacent to an outer surface of the light colored layer. Such methods of printing are well known to one of ordinary skill in the art and, as such, are not described herein in detail.

With respect to the dark colored layer aspect of the invention, the following method may be utilized. After preparation and drying of the packaging substrate, a dark colorant containing solution, for example, comprising starch, dark colored pigment and water can be applied on a wet stack calendar (in addition to or instead of applications on a size press for Fourdrinier machines). The wet stack may consist of a stack of rollers, which may be from five or seven rollers high. The web may then be threaded through this stack. Water boxes containing the percent solution may be placed adjacent to one roller for the topside of the web and another roller for the bottom side of the web. The dark colored layer can be applied to the web as the web passes the water boxes.

In separate aspects, the dark colored layer may be adjacent to the substrate and the light colored layer may be adjacent to the dark colored. Still further, the dark colored layer may be proximal to the substrate and adjacent to the light colored layer. Still further, the dark colored layer may be proximal to the substrate and the light colored layer may be proximal to the dark colored layer.

In addition to the previously described layers, a barrier or fixing layer separate from the light and or dark colored layer may be added at any location on the packaging material without detracting from the purposes of the present invention. For example, a clear barrier or fixing coat may be disposed between the outer surface of the substrate and the dark colored layer, between the dark colored layer and the light colored layer or may be disposed on the surface of the light colored layer before or after the application of a printed layer, if any.

As noted, binders may be useful in the light and/or dark colorant-containing solutions herein and will be present in binder solutions as binder solids as discussed below. Binders suitable for use in the first or light colored solutions herein may comprise naturally- or synthetically-derived materials.

In particular aspects, suitable synthetic binders may comprise latex polymers, wherein such latex polymers are derived from monomers comprising one or more of: acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl, glycidyl methacrylate, carbodiimide methacrylate, $C_1$-$C_{18}$ alkyl crotonates, di-n-butyl maleate, α- or -β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, vinyl acetate, vinyl ethylene carbonate, epoxy butene, 3,4-dihydroxybutene, hydroxyethyl (meth)acrylate, methacrylamide, acrylamide, butyl acrylamide, ethyl acrylamide, vinyl(meth)acrylates, or isopropenyl (meth)acrylate. In particular, suitable latexes may include one or more of: styrene butadiene (SBR), polyvinyl acetate, polyvinyl acetate-acrylate, ethylene vinyl acetate, styrene acrylates, polyacrylates and acrylic materials. Still further, naturally derived binders may be used in the present invention. Such binders may include, but are not limited to, soy or animal protein materials.

One of ordinary skill in the art will recognize that such binders may be useful in the methods of the present invention to assist in holding the colorant particles together and to the packaging substrate. The type of binder utilized in the methods of the present invention may vary depending on the particular colorant utilized, the packaging substrate and the intended end use for the packaging material. For example, SBR binders typically provide very good binding strength, gloss, ink holdout, and flexibility. PVAc binders can provide good gluing properties, brightness stability, ink receptivity, and low odor. Protein binders may contribute to appearance, gloss, fountain solution acceptance, and glueability.

As for binder amounts to be included in the solutions, a binder may be present in the dark and/or light colorant-containing solutions in an amount of from about 17 to about 60% by weight of each individual colorant-containing solution. Still further, the binder may be present in the dark and/or light colorant-containing solutions in an amount of from about 17 to about 37% by weight of each individual colorant-containing solution. Still further, the amount of binder may be from 23% to 40% by weight of each individual colorant-containing solution. In a further aspect, the binders may be present at from about 25% to about 35% by weight of each individual colorant-containing solution. Still further, the binders may be present in the individual colorant-containing solutions in the amount of from about 20, 25, 30, 35, 40, 45, 50, 55, 60, 65 or 70% by weight of each individual colorant-containing solution, where any of these values may form the lower endpoint and the upper endpoint and any lower value may be utilized with any upper value. In a further aspect, the amount of binder is greater than 17% by weight. One of ordinary skill in the art will recognize that such binder materials are often supplied as % solids in liquid. The values recited herein are measure as total dry weight under solids used in the coating compositions.

In further aspects, a mixture of synthetically and naturally derived binders may be utilized in the individual colorant containing solutions. In one non-limiting aspect of the invention, the individual colorant containing solutions may comprise a mixture of latex polymer binder and animal and/or vegetable protein, wherein the total amount of binder in the acting composition is measured by the sum of the weight percent of latex polymer solids and the soy protein solids. In a further aspect, the ratio of latex polymer to animal and/or vegetable protein is from about 2:1 to about 20:1, or from about 2:1 to about 10:1, where the total amount of binder in the individual colorant containing solutions is as stated previously. Still further, the ratio of latex polymer to animal and/or vegetable protein is from about 7:1 to about 12:1, where the total amount of binder in the individual colorant-containing solutions is stated previously. Yet still further, the ratio of latex polymer to animal and/or vegetable protein is from about 3:1, 5:1, 7:1, 9:1, 10:1, 11:1, 13:1, 15:1, 17:1, 19:1, where any lower value may be paired with any upper value and where the total amount of binder in the individual colorant-containing solutions is as stated previously.

In one aspect, the dark colored layer does not comprise binder and the light colored layer comprises binder. In a further aspect, the dark colored layer comprises binder and the light colored layer does not comprise binder. Still further, in another aspect, each of the colored layers comprise binder.

Although the amounts of components in the individual colorant solutions are recited above, it should be noted that the amount of pigment, binder and/or other ingredients, will be, in part, affected by factors such as the base color of the substrate and the amount and duration of the grease masking needed in a particular application. For example, where recycled paperboard or SUS board stock is utilized as a substrate, the base color of the substrate will be darker (or less white). Accordingly, the amount of pigment in the light colored layer(s) may need to be higher in order to satisfactorily hide the color of the substrate. In contrast, if SBS is utilized as the substrate, the amount of light colored pigment needed in the light colored layer(s) may be lower than that needed for a darker colored substrate because this substrate is less dark in color.

Moreover, while the specific type of binder(s) utilized in the present invention has not been found to be crucial to the present invention, one of ordinary skill in the art would recognize that the amount of pigment in the colorant containing solutions should directly affect the amount of binder to be included in the solutions. Thus, where a lower amount of light colored pigment is utilized (as discussed above), a proportionally lower amount of binder will be necessary. However, in accordance with the grease, fat or oil masking compositions and methods of the present invention, the amount of binder needed for a particular application has been found to be in excess of the amount of binder utilized for that same particular application where no grease, fat or oil masking properties are present.

The dark and light colored layers may be applied utilizing existing methods of applying coatings to packaging substrates. Such methods and compositions useful herein are known generally to one of ordinary skill in the art of packaging material manufacture and, as such, are not described in detail herein. Methods and compositions that may be utilized according to the invention herein are disclosed in U.S. Pat. Nos. 3,196,038, 3,873,345, 4,265,969 and 4,301,210, the disclosures of which are each incorporated herein in their entireties by this reference.

Further specific examples of coating methods that may be utilized include the following.

In a major aspect, an in-line coating method maybe utilized to reduce the cost of the coating process, however, in another aspect an off-line process may be utilized. Coating processes that may be utilized include, but are not limited to: roll coating, rigid blade, straight blade or bent blade, air knife or a combination of coaters. Additionally, the compositions of the invention may be applied utilizing rotogravure and flexographic methods.

Roll coaters will generally not be utilized as a stand-alone coating method but may be used as the applicator roll in each of the coating processes discussed below. One of ordinary skill in the art will recognize that roll coaters operate similarly to a roller one uses to paint a wall at home. That is, in one aspect, the roll may rotate in a vat of coating and continues to rotate until it comes into contact with the paperboard and applies the wet coating thereto. The wet coating may then immediately be removed by either a blade, rod, or air knife.

A blade coater may be utilized to remove excess coating by use of a rigid (straight) or bent blade. In either aspect, the blade may actually contact the paperboard and scrape off the excess coating. Blade coaters will generally leave more coating in the low areas (valleys) and less coating on the high areas (hills) of the paperboard.

Blade coatings may be utilized to level off and seal the paperboard. Blade coatings generally augment paperboard smoothness and may be preferable for some end uses. A typical blade coater will generally apply from about 1 to 2 dry pounds of coating per 1000 square feet. Blade coaters are generally utilized to apply base coating (primers) as well as top coatings to seal the sheet. Blade coaters are particularly useful when the packaging substrate utilized herein is SBS.

A rod coater may be utilized according to the invention herein to remove excess coating with a smooth or wire wound rod. The rod may be placed in a holder and may be slowly rotated as coating is wiped away. One of ordinary skill in the art will recognize that a rod coater operates similarly to a blade coater in that it generally levels and seals the sheet, but may also follow the natural contour of the paperboard surface. Rod coaters can be considered to allow a greater margin for error than a blade coater, in that small impurities that can cause scratches and streaks in the blade process are more likely to pass under the rod and not cause these defects. For this reason, rod coaters will be useful in the present invention when the packaging substrate comprises recycled paperboard and or SUS. Rod coaters will generally apply from about 1 to 3 dry pounds of coating per 1000 square feet.

In a further aspect, an air knife coater may be utilized to remove excess dark and/or light colored layer by the blowing of a thin jet of air on the wet coating. The air knife generally leaves a more uniform film thickness of coating across the entire web by following the contour of the sheet. Thus, if the surface of the packaging substrate is rough, it will remain rough. If it is smooth, it will generally remain smooth. Because of its excellent uniformity and its greater thickness, air knife coatings may be utilized when an opaque coating is desired. Air knife coatings are particularly useful for coating SBS and recycled paperboard. Typical air knife coaters will generally apply about 2 to about 6 dry pounds of coating per 1000 square feet.

In accordance with the methods herein, two, three or more coating units may be utilized to prepare the packaging material. In one aspect, the use of multiple coating methods may allow improved smoothness of the surface of the packaging material and may generally allow improved printability. One of ordinary skill in the art will recognize that various combinations may be utilized depending on the characteristics of the packaging substrate and the performance and cost attributes desired in the finished packaging material.

It will be recognized that when applied from a colorant-containing solution, the one or more colored layers are applied wet and should normally be dried. Drying of the packaging materials can be accomplished using either forced air or infrared dryers. In some cases both methods may be used.

In a further aspect, the coated packaging material may be dry calendared either before or after the application of a printed layer, if one is desired. One of ordinary skill in the art will recognize that dry calendaring is a process of polishing the coated substrate and of controlling caliper and density of the finished surface. Calendar finishing is generally performed to improve smoothness and increase gloss of the finished packaging material. In accordance with the present invention, a stack of calendar rolls may be utilized; this is generally referred to as "hard nip calendaring." Alternatively, gloss calendars having a highly-polished, heated cylinder that is loaded against a resilient rubber backing roll may be utilized. As the packaging substrate outer surface comes into contact with the polished hot roll and enters the calendar nip (between the two rolls), a slight change in speed may occur which results in a polishing of the coating. This process is referred to as "soft nip calendaring." Methods of calendaring are known generally to those of ordinary skill in the art. Non-exclusive examples of calendaring are disclosed in U.S. Pat. No. 5,029,521, the disclosure of which is incorporated herein in its entirety by this reference.

In a further major aspect of the invention herein, the dark colored layer and light colored layer each, independently, may comprise one or more of polyethylene, polyester, polypropylene, polystyrene, or halogenated or non-halogenated vinyl polymers. Such materials may also be considered, in some aspects, to comprise binder materials. With respect to the polyethylene aspect, suitable polyethylenes include HDPE, MDPE, LDPE, LLDPE, homogenously branched linear ethylene polymers and substantially linear ethylene polymers. Such materials may also be considered, in some aspects, to comprise binder materials. In this aspect, the dark colored layer and the light colored layer each, independently, may comprise from about 5 to about 40% colorant as measured by total weight of each individual layer. Still further, the dark colored layer and the second layer each, independently, may from about 5, 10, 15, 20, 30, 40, 45, and 50% colorant, where any of these numbers may comprise either endpoint for the amount of colorant and any lower endpoint may be utilized with any upper endpoint. While any of the above-described colorants may be utilized in this aspect of the invention, in one further particular aspect, the light colorant may comprise titanium dioxide and the dark colorant may comprise carbon black.

In this aspect of the invention, a grease, fat or oil permeable substrate having an outer surface is provided whereby a dark colored layer may be extruded onto the outer surface of the substrate and a light colored layer may be simultaneously or sequentially extruded onto an outer surface of the dark colored layer. Alternatively, a paperboard material may be utilized wherein one or more layers (plys) of the paperboard are colored with a dark colorant. In this latter aspect, a one or more colored layers may be extruded onto the outer surface of the colored paperboard with or without application of a precoat layer.

Methods of extrusion coating packaging materials are known generally to one of ordinary skill in the art, and, as such, need not be described in detail herein. Non-exclusive examples of extrusion coating methods that may be utilized according to the invention herein are described generally in U.S. Pat. Nos. 4,343,858 and 4,455,184, the disclosures of which are each incorporated herein in their entireties by this reference.

In a further aspect, one or more of the colored layers may be extruded either simultaneously or sequentially to form a laminate material. This laminate material may be applied to the outer surface of the substrate of the invention herein to form either or both of the colored layers.

In still a further aspect, a dark colored layer may be applied to the substrate and a light color layer may be extruded to the dark colored surface. For example, a dark colored layer having an inner and an outer surface may be applied from a dark colorant-containing solution as set forth above. A light colored layer having an inner and an outer surface may then be extruded thereto. Alternatively, a dark colored paper or fabric may be applied to a paperboard, paper or fabric substrate and a light colored layer extruded thereto.

The substrates treated according to the present invention may be utilized in a number of different applications. In specific non-limiting examples, packaging materials in the form of a box, cup, tray, plate, can, tube, bottle or other container form may be prepared. Materials packaged therein may be consumer goods. In separate examples, the packaging materials may be used for both food and non-food packaging. As examples of food that may suitably be packaged in materials treated with the compositions and methods of the present invention, the following non-limiting examples are presented: sweets, chocolate, confectionery, pastries, biscuits, dairy products (e.g., butter and cheese), powdery foodstuffs (e.g., coffee, tea, cocoa, flour, cereals), frozen food (e.g., ice cream, pastries, vegetables, seafood), fresh and semipreserved foods, pet food or carryout foods. Non-limiting examples of non-food packaging that may suitably be packaged in materials treated with the compositions and methods of the present invention include: cosmetics, toiletries, pharmaceuticals, cigarettes, detergents, textiles, toys, games, tools, household appliances, pesticides, fertilizers, hobby items, paper products, cassettes, record sleeves, and auto parts.

Converting methods known generally in the art may be utilized to form the packaging materials of the present invention. For example, the packaging material may be fabricated into a box configuration, a tube (shell) configuration, a tray configuration, or a bottle wrap configuration. These recited examples are meant to be illustrative only and one of ordinary skill in the art would recognize that the types of packaging materials that may be fabricated utilizing the grease, fat or oil masking compositions of the present invention may encompass a wide variety of configurations. Moreover, one of ordinary skill in the art would recognize conventional converting methods (i.e., cutting, creasing, and gluing) are suitable for use in conjunction with the present invention.

EXPERIMENTAL

The following examples are put forth so as to provide those of ordinary skill in the art with a complete disclosure and description of how the compounds, compositions, articles, devices, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° F. or is at ambient temperature, and pressure is at or near atmospheric.

Bending chip recycled paperboard ("uncoated box board") was utilized in the examples.

Suitable formulations for use in the present invention are set forth in Tables 1 and 2 below.

Various grease, fat or oil-containing packaged goods were tested in packaging materials treated with formulations of the present invention, such as those described below. Such tests were run for extended times and at elevated temperatures as described.

All tests utilized grease, fat or oil-containing materials. Where known, test results set forth below include the weight percent of grease, fat or oil in the subject materials. However, since some tested product were proprietary formulations, the amount of grease, fat or oil within the product was unknown. In such cases, grease, fat or oils that may be present in the tested product are described.

TABLE 1

Air Coating Method

| Material | Supplier | Product name | % solids | wet lbs | dry lbs | pigments | pigment |
|---|---|---|---|---|---|---|---|
| Kaoline clay | Theile Kaolin Company | KaoPrint | 0.68 | 15 | 10.2 | 47.6% | 68.8% |
| TiO2 | Trioxide Americas, Inc. | RR-BC slurry | 0.75 | 15 | 11.25 | 52.4% | |
| Protein | Protein Technologies | Pro-Cote 427 | 0.15 | 8 | 1.2 | 3.8% | Protein % |
| Latex | Rohm & Haas | Res 3083 | 0.5 | 17 | 8.5 | 27.3% | latex % |
| Defoamer | Nalco Chemical Company | Nalco 8669 | 0.76 | 0.038 | 0.029 | 0.09% | |
| Water | | | 0 | 5 | 0 | | |
| | | | | 60.4 | 31.18 | 31.1% | Total % comb. Binder |
| | | | | cal. Solids | 52% | 39.6 | Parts latex |
| | | | | | | 5.6 | Parts protein |
| | | | | | | 45.2 | Parts binder |

TABLE 2

Rod Coating Method

| Material | Supplier | Product name | % solids | wet lbs | dry lbs | dry pigments | Pigment |
|---|---|---|---|---|---|---|---|
| Kaoline clay #1 | Theile Kaolin Company | Kaobrite | 0.68 | 15 | 10.2 | 45.8% | 68.9% |
| Kaoline clay #2 | Theile Kaolin Company | KaoPrint | 0.68 | 15 | 10.2 | 45.8% | |
| TiO2 | Trioxide Americas, Inc. | RR-BC slurry | 0.75 | 2.3 | 1.73 | 7.8% | |
| Black | Various | FDA listed pigment | 0.8 | 0.16 | 0.13 | 0.6% | |
| Latex | Rohm & Haas | Res 3083 | 0.5 | 20 | 10 | 31.0% | |
| Defoamer | Nalco Chemical Company | Nalco 8669 | 0.76 | 0.02 | 0.015 | 0.05% | |
| Thickener | Alco Chemical | Alcogum 149 | 0.354 | 0.078 | 0.028 | 0.09% | |
| Water | | | 0 | 5 | 0 | | |
| | | | | 57.6 | 32.30 | 31.0% | % Binder |
| | | | | cal. Solids | 56.1% | 44.9 | Parts binder |

TABLE 3

COATING FORMULATIONS TESTED

| First Down (White/light) Top Coating(s) | Coating Formula #1 | Coating Formula #1A | Coating Formula #1C | Coating Formula #1D | Coating Formula #2A | Coating Formula #2B |
|---|---|---|---|---|---|---|
| Pigments | | | | | | |
| Kaolin Clay 1 | 28.7% | 35.2% | 35.2% | 35.2% | 35.2% | 35.2% |
| Kaolin Clay 2 | 0.0% | 0.0% | 0.0% | 0.0% | 0.0% | 0.0% |
| TiO2 | 71.3% | 29.1% | 29.1% | 29.1% | 29.1% | 29.1% |
| Total Pigment % | 63.0% | 64.3% | 64.3% | 64.3% | 64.3% | 64.3% |
| Binders | | | | | | |
| Soy Protein | 2.5% | 0.0% | 0.0% | 0.0% | 0.0% | 0.0% |
| Poly vinyl acetate latex | 34.1% | 35.6% | 35.6% | 35.6% | 35.6% | 35.6% |
| Total % comb. Binder | 36.6% | 35.6% | 35.6% | 35.6% | 35.6% | 35.6% |
| Additives | | | | | | |
| Thickener | 0.07% | 0.0% | 0.0% | 0.0% | 0.0% | 0.0% |
| Alcosperse | 0.1% | 0.0% | 0.0% | 0.0% | 0.0% | 0.0% |
| Defoamer | 0.25% | 0.0% | 0.0% | 0.0% | 0.0% | 0.0% |
| First down (dark) coating | | | | | | |
| Starch Cationic | 5% | 0 | 0 | 0 | 0 | 0 |
| Black Pigment | 0.6% | 0.1% | 0.2% | 0.2% | 0.51% | 0.51% |
| Water | 94.40% | 0.0 | 0 | 0 | 0 | 0 |
| Pigments | | | | | | |
| Kaolin Clay 1 | 0% | 0.0% | 0.0% | 0.0% | 0.0% | 0.0% |
| Kaolin Clay 2 | 0% | 64.6% | 64.6% | 57.0% | 60.3% | 60.3% |
| TiO2 | 0% | 0.0% | 0.0% | 11.1% | 6.4% | 6.4% |
| Total Pigment % | 0% | 64.6% | 64.6% | 68.1% | 66.6% | 66.6% |
| Binders | | | | | | |
| Soy Protein | 0 | 0.0 | 0.0 | 0.0 | 0.0 | 0.0 |
| Poly vinyl acetate Latex | 0.0 | 35.3% | 35.2% | 31.7% | 32.8% | 32.8% |
| Total % comb. Binder | 0% | 35.3% | 35.2% | 31.7% | 32.8% | 32.8% |
| Additives | 0 | 0 | 0 | 0 | 0 | 0 |
| Thickener | 0 | 0 | 0 | 0 | 0 | 0 |
| Dispersant | 0 | 0 | 0 | 0 | 0 | 0 |
| Defoamer | 0 | 0 | 0 | 0 | 0 | 0 |

| First Down (White/light) Top Coating(s) | Coating Formula #2C | Coating Formula #5 | Coating Formula #6 | Coating Formula #7 | Coating Formula #7-4B | Coating Formula #8 |
|---|---|---|---|---|---|---|
| Pigments | | | | | | |
| Kaolin Clay 1 | 35.2% | 35.2% | 17.6% | 44.90% | 44.9% | 44.9% |
| Kaolin Clay 2 | 0.0% | 0.0% | 0.0% | | | |
| TiO2 | 29.1% | 29.1% | 46.6% | 18.1% | 18.1% | 18.1% |
| Total Pigment % | 64.3% | 64.3% | 64.2% | 63.0% | 63.0% | 63.0% |
| Binders | | | | | | |
| Soy Protein | 2.0% | 2.9% | 0.0% | 2.5% | 2.5% | 2.5% |
| Poly vinyl acetate latex | 33.0% | 31.0% | 35.6% | 34.1% | 34.1% | 34.1% |
| Total % comb. binder | 35.0% | 33.9% | 35.6% | 36.6% | 36.6% | 36.6% |
| Additives | | | | | | |
| Thickener | 0.0% | 0.31% | 0.065% | 0.07% | 0.07% | 0.07% |
| Dispersant | 0.0% | 0.16% | 0.12% | 0.10% | 0.10% | 0.10% |
| Defoamer | 0.0% | 0.04% | 0.007% | 0.25% | 0.25% | 0.25% |
| First down (dark) coating | | | | | | |
| Starch Cationic | 0 | 0 | 0 | 0 | 5% | 5% |

TABLE 3-continued

COATING FORMULATIONS TESTED

| | | | | | | |
|---|---|---|---|---|---|---|
| Black Pigment | 0.51% | 0.15% | 0.15% | 0.2% | 0.6% | 0.6% |
| Water | 0 | 0.0 | 0.0 | 0.0 | 94.40% | 94.40% |
| Pigments | | | | | | |
| Kaolin Clay 1 | 0.0% | 31.0% | 29.9% | 30.2% | 0% | 0% |
| Kaolin Clay 2 | 60.3% | 31.0% | 29.9% | 30.2% | 0% | 0% |
| TiO$_2$ | 6.4% | 5.0% | 5.1% | 5.1% | 0% | 0% |
| Total Pigment % | 66.6% | 67.0% | 64.9% | 65.5% | 0% | 0% |
| Binders | | | | | | |
| Soy Protein | 0.0 | 0.0 | 0.0 | | 0 | 0 |
| Poly vinyl acetate Latex | 32.8% | 32% | 35% | 34% | 0.0 | 0.0 |
| Total % comb. Binder | 32.8% | 32.0% | 35.2% | 34.0% | 0% | 0% |
| Additives | 0 | | | | 0 | 0 |
| Thickener | 0 | 0.31% | 0.15% | 0.21% | 0 | 0 |
| Dispersant | 0 | 0.16% | 0.10% | 0.00% | 0 | 0 |
| Defoamer | 0 | 0.04% | 0.15% | 0.04% | 0 | 0 |

TABLE 4

Masking of Packaging Material Contacted with Votive Candles or Oil Impregnated Dusting Gloves

| Substrate | Votive Candles* | Oil impregnated Dusting Glove (~5% mineral oil) |
|---|---|---|
| Coating Formula 1 Stack test Stored at 120 deg F. Evaluated at 31 days | Good - No outside staining and very little inside staining | |
| Coating Formula 1 Carton test Stored at 120 deg F. | | Good - No outside staining; very little to no inside staining |
| Evaluated at 117 days Coating Formula 1 Carton test Stored at TAPPI conditions (73 deg. F., 50% humidity) Evaluated at 117 days | | Good - No outside staining; very little to no inside staining |

*Composition of votive candles unknown. Such candles are known to include petroleum (oily) waxes and fragrance oils

TABLE 5

Masking of Packaging Materials Contacted with Various Cat Food Formulations

| Substrate | Cat Food Formula I (≥10% Fat Content) | Cat Food Formula II (≥14% Fat Content) |
|---|---|---|
| Coating Formula 1 Hand filled Carton test Stored at 120 deg F. Evaluated at 61 days | Good - No outside staining; Moderate inside staining; no staining to corrugated under carton | Good - No outside staining; Moderate inside staining; no staining to corrugated under carton |
| Coating Formula #7-4B Pile test Stored at 120 deg F. Evaluated at 117 days | | Good - No outside staining; Moderate inside staining |
| CCNB (comparative) Pile test Stored at 120 deg F. Evaluated at 21 days | Poor staining | Poor staining |
| Low density Polyethylene Extruded CCNB Paperboard Clear Inside Poly (½ mil inside) (comparative) Stored at 120 deg F. Evaluated at 21 days | Poor - Inside edge wicking | Poor - Inside edge wicking |
| White Outside low density Polyethylene extrusion coated CCNB - (comparative) Stored at 120 deg F. Evaluated at 21 days | Poor - Outside staining visible | Poor - Outside staining visible |
| White 2-sided low density Polyethylene extrusion | Poor - Inside edge wicking | Poor - Inside edge wicking |

TABLE 5-continued

Masking of Packaging Materials Contacted with Various Cat Food Formulations

| Substrate | Cat Food Formula I (≧10% Fat Content) | Cat Food Formula II (≧14% Fat Content) |
|---|---|---|
| coated CCNB (comparative) Stored at 120 deg F. Evaluated at 21 days | | |
| Metalized Polyester Film laminated to CCNB (comparative) Stored at 120 deg F. Evaluated at 21 days | Good - Inside staining, no outside staining | Good - Inside staining, no outside staining |
| Coating Formula #1A, 1C, 1D Stored at 120 deg F. Evaluated at 21 days | Good - Slight inside staining, no outside staining | Good - Slight inside stain; shiny area on outside where product was piled (not a stain appearance) |
| PM Stored at 120 deg F. Evaluated at 21 days | Good - Inside edge wicking, no outside staining | Good - Inside edge wicking, no outside staining |

TABLE 6

Masking of Packaging Materials Contacted with Various Dog Snack Formulations

| Substrate | Dog Snacks Formula I (≥4% Fat Content) | Dog Snacks Formula II (≥3% Fat Content) | Dog Snacks Formula III (≥6% Fat Content) | Dog Snacks Formula IV (≥6% Fat Content) | Dog Snacks Formula V (≥14% Fat Content) |
|---|---|---|---|---|---|
| Coating Formula 1 Machine filled Carton test Stored at 120 deg F. Evaluated at 61 days | | | | | Good - No outside stains; moderate inside staining |
| RF2 (comparative) Machine filled Carton Test Stored at 120 deg F. Evaluated at 61 days | | | | | Poor - Moderate staining seen on printed side; moderate inside staining |
| Coating Formula 1 Hand filled carton test Stored at 120 deg F. Evaluated at 72 days | | | | Good - No outside staining; no staining on corrugated under carton | Good - No outside staining; moderate inside staining; no staining to corrugated under carton |
| RF2 (comparative) Test Stored at 120 deg F. Evaluated at 72 days | | | | Poor - Several stains on printed side; no staining to corrugated under carton | Poor - Many oil droplet stains on printed side; moderate inside staining, no staining to corrugated under carton |
| Coating Formula #7-4B Pile test Stored at 120 deg F. Evaluated at 117 days | | | | | Good - no outside staining, moderate inside staining |
| CCNB (comparative) Hand-filled cartons Stored at 120 deg F. Evaluated at 21 days | Good - No inside or outside staining | Good - No inside or outside staining | Marginal - No major staining, several small spots of staining | Poor - ¼" stains in several areas of the carton | Poor - Staining all over the outside of the carton |
| Low density Polyethylene Extruded (½ mil inside) CCNB Paperboard (comparative Pile Test Stored at 120 deg F. Evaluated at 21 days | Good - No edge wicking or staining | Good - No edge wicking or staining | Good - No edge wicking or staining | Good - No edge wicking or staining | Poor - Edge staining |
| Coating Formula #1D Pile test Stored at 120 deg F. Evaluated at 21 days | Good - No outside staining | Good - No outside staining | Good - No outside staining | Good - No outside staining | Good - No outside staining |
| PM Pile Test Stored at 120 deg F. Evaluated at 21 days | Good - No outside staining | Good - No outside staining | Good - No outside staining | Good - No outside staining | Good - No outside staining |

TABLE 7

Masking of Packaging Materials Contacted with Hand Lotion*

| Substrate | Lotion Drop Test (7 hours) | Lotion Stack Test (3 weeks) | Lotion Product Storage Test (3 weeks) |
|---|---|---|---|
| Coating Formula #8 Hand filled Carton Stored at 120 deg F. | Good - No outside staining | Good - No outside staining | Good - No outside staining |
| Coating Formula #7- 4B Stored at 120 deg F. | Good - No outside staining | Good - No outside staining | |
| Coating Formula #6 Stored at 120 deg F. | Good - No outside staining | Good - No outside staining | |
| Coating Formula #5 Stored at 120 deg F. | Good - No outside staining | Good - No outside staining | |
| Coating Formula #2A, 2B, 2C Stored at 120 deg F. | Good - No outside staining | Good - No outside staining | |
| Coating Formula #1- 1A, 1B, 1C Stored at 120 deg F. | Good - No outside staining | Good - No outside staining | |

*Lotion formulation unknown, but hand lotions known to contain moderate amounts of oils, including mineral oil.

TABLE 8

Masking of Packaging Materials Contacted with Biscuit Mix

| Substrate | Biscuit Mix (≧14% Fat Content) |
|---|---|
| Coating Formula 1 Hand filled carton test Stored at 120 deg F. Evaluated at 72 days | Good - No outside staining; Light inside staining; no staining to corrugated under carton |
| RF1 (comparative) Machine filled Carton test Stored at 120 deg F. Evaluated at 72 days | Good - No outside staining; no staining to corrugated under carton |
| Coating Formula #7-4B Pile Test Stored at 120 deg F. Evaluated at 117 days | Good - No outside staining, Light inside staining |
| CCNB (comparative) Pile test Stored at 120 F. Evaluated at 26 days | Poor staining |
| Low density Polyethylene Extruded CCNB Paperboard (½ mil inside) (comparative) Pile Test Stored at 120 deg F. Evaluated at 26 days | Good - No staining or edge wicking |
| GM (comparative) Pile test Stored at 120 deg F. Evaluated at 26 days | Poor - Light staining through the board |
| 2 sided White Low density Poly CCNB (comparative) Pile Test Stored at 120 deg F. Evaluated at 26 days | Good - No staining or edge wicking |
| White outside Poly (comparative) Pile Test Stored at 120 deg F. Evaluated at 26 days | Poor - Significant staining |

TABLE 9

Masking of Packaging Materials Contacted with Lotion Impregnated Tissues*

| Substrate | Lotion-containing Tissues |
|---|---|
| Coating Formula 1 Hand filled carton Test Stored at 120 F. Evaluated at 72 days | Good - No outside staining |
| Coating Formula 1 Hand filled carton Test Stored at TAPPI conditions (73 deg. F., 50% humidity) Evaluated at 72 days | Good - No outside staining |

*Amount and formulation of lotion in tissues unknown, but lotion compositions known to contain moderate amounts of oils, including mineral oils.

TABLE 10

Masking of Packaging Materials Contacted with Various Cat Food

| Substrate | Cat Formula III (≧14% Fat Content) | Cat Formula IV (≧12% Fat Content) |
|---|---|---|
| Coating Formula 1 Carton test Stored at 120 F. Evaluated at 72 days | Good - No outside staining; moderate inside staining; moderate staining at one corner of carton to corrugated under carton | |
| Coating Formula #7-4B Piled test Stored at 120 F. Evaluated at 117 days | | Good - No outside staining; moderate inside staining |
| CCNB (comparative) Piled Test Stored at 120 F. Evaluated at 183 days | Poor - Inside and outside staining | Poor - Inside and outside staining |
| Coating Formula #2C Piled test Stored at 120 F. Evaluated at 183 days | Good - No outside staining | Good - No outside staining |

TABLE 11

Masking of Packaging Materials Contacted with Various Cat Food Formulations

| Substrate | Cat Formula V (≥8% Fat Content) |
|---|---|
| Coating Formula 1 Carton test Stored at 120 F. Evaluated at 72 days | Good - No outside staining; Heavy staining on inside of carton; Heavy staining on corrugated under the carton |
| RF2 (comparative) Pile test Stored at 120 F. Evaluated at 117 days | Marginal - No inside staining; slight staining on printed side of sample |
| Coating Formula #7-4-B Piled test | Good - No outside staining; Heavy staining on inside of |

TABLE 11-continued

Masking of Packaging Materials Contacted with Various Cat Food Formulations

| Substrate | Cat Formula V (≥8% Fat Content) |
|---|---|
| Evaluated at 21 days Coating Formula #2A, 2B, 2C Filled Carton test Stored at 120 F. Evaluated at 36 days | Good - No outside staining; Heavy staining on fiber side of paperboard; Staining on paperboard under the sample |
| Coating Formula #2A, 2B, 2C Piled test Stored at 140 F. Evaluated at 14 days | Good - No outside staining; Heavy staining on fiber side of paperboard |

TABLE 13

Masking of Packaging Materials Contacted with Gravy Mix, Pancake Mix and Biscuit Mix

| Substrate | Gravy Mix (~10% Fat Content) | Pancake Mix (~3% Fat Content) | Biscuit Mix II (≥3% Fat Content) |
|---|---|---|---|
| Coating Formula #7-4B Pile Test Stored at 120 F. Evaluated at 117 days | Good - No outside staining, Light inside staining | | |
| Low density Polyethylene Extruded CCNB Paperboard (½ mil inside) (comparative) Filled Carton Test Stored at 120 F. Evaluated at 154 days | Good- No staining or edge wicking; Very slight staining seen after 4 months, however, print graphics would likely cover the stain; Staining at die cut edges and along bottom fold is worsening in the 5th month of storage | | |
| CCNB (comparative) Filled Carton Test Stored at 120 F. Evaluated at 154 days | | Good - No staining or edge wicking | |
| CCNB (comparative) Pile Test Stored At 120 Deg F. Evaluated at 24 days | Poor - Major staining | Good - No staining or edge wicking | Good - No staining or edge wicking |
| Low density Polyethylene Extruded CCNB Paperboard (½ mil inside) (comparative) Pile Test Stored at 120 F. Evaluated at 28 days | Good - No staining | Good - No staining | Good - No staining |
| PM (comparative) Pile Test Stored at 120 F. Evaluated at 28 days | Good - No staining to the print side | Good - No staining | Good - No staining |

TABLE 11-continued

Masking of Packaging Materials Contacted with Various Cat Food Formulations

| Substrate | Cat Formula V (≥8% Fat Content) |
|---|---|
| Stored at 120 F. Evaluated at 117 days | paperboard |
| Low density Polyethylene Extruded CCNB Paperboard (½ Mil inside) (comparative) Hand-filled carton test Stored at 120 F. | Poor - Pin-holing staining on carton; heavy edge wicking staining |

TABLE 14

Masking of Packaging Materials Contacted with Snack Crackers and Dog Biscuits.

| Substrate | Snack Crackers (~16% Fat Content) | Dog Biscuits (~6% Fat Content) |
|---|---|---|
| Coating Formula 1 Hand filled carton Test without inner liner Stored at 120 deg F. Evaluated at 22 days | | Good - No outside staining, no inside staining |
| Coating Formula 1 Hand filled carton Test without inner liner | Good - No outside staining, very slight staining to corrugated | |

TABLE 14-continued

Masking of Packaging Materials Contacted with Snack Crackers and Dog Biscuits.

| Substrate | Snack Crackers (~16% Fat Content) | Dog Biscuits (~6% Fat Content) |
|---|---|---|
| Stored at 120 deg F. Evaluated at 72 days | at corners of carton | |
| Coating Formula 1 Hand filled carton Test without inner liner Stored at 140 deg F. Evaluated at 72 days | Good - No outside staining, very slight staining to corrugated at corners of carton | |
| Coating Formula 1 Hand filled carton Test without inner liner Stored at TAPPI conditions (73 deg. F., 50% humidity) Evaluated at 72 days | Good - No outside staining, no staining to corrugated under carton | |
| RF2 without inner liner (comparative) Stored at 120 F. Evaluated at 72 days | Good - No outside staining, medium staining to corrugated at corners of carton | |
| RF2 (comparative) Stored at 140 F. Evaluated at 72 days | Good - No outside staining, medium staining to corrugated at corners of carton | |
| RF2 (comparative) TAPPI conditions (73 deg. F., 50% humidity) Evaluated at 72 days | Good - No outside staining, no staining to corrugated under carton | |
| Coating Formula #2A, 2B, 2C Pile Test Stored at 140 deg. F. at 14 days | Good - No staining | |

TABLE 15

Masking of Packaging Materials Contacted with Various Dryer Sheets*

| Substrate | Dryer Sheet I | Dryer Sheet II | Dryer Sheet III | Dryer Sheet IV |
|---|---|---|---|---|
| Coating Formula 1 Hand-filled Carton test Stored at 120 F. Evaluated at 4 days | Good - No outside staining | Good - No outside staining | Good - No outside staining | Good - No outside staining |
| Coating Formula 1 Hand-filled Carton test Stored at 100 F./70% RH Evaluated at 4 days | Good - No outside staining | Good - No outside staining | Good - No outside staining | Good - No outside staining |
| Coating Formula 1 Hand-filled Carton test 80 deg F./80% RH Evaluated at 4 days | Good - No outside staining | Good - No outside staining | Good - No outside staining | Good - No outside staining |
| Coating Formula 1 Hand-filled Carton test Stored at TAPPI conditions (73 deg. F., 50% humidity) Evaluated at 4 days | Good - No outside staining | Good - No outside staining | Good - No outside staining | Good - No outside staining |
| Low density Polyethylene Extruded (½ mil inside) CCNB Paperboard (comparative) Hand-filled carton test Stored at 120 F. Evaluated at 4 days | Good - No outside staining | Poor - Major outside staining around die cut perforations | Marginal - Slight outside staining around perforations | Good - No outside staining |
| Low density Polyethylene Extruded (½ mil inside) CCNB Paperboard (comparative) Hand-filled carton test Stored at 100 F./70% RH Evaluated at 4 days | Good - No outside staining | Good - No outside staining | Good - No outside staining | Good - No outside staining |
| Low density Polyethylene Extruded (½ mil inside) CCNB Paperboard (comparative) Hand-filled carton test Stored at 80 deg F./80% RH Evaluated at 4 days | Good - No outside staining | Good - No outside staining | Good - No outside staining | Good - No outside staining |
| Low density Polyethylene Extruded (½ mil inside) CCNB Paperboard (comparative) Hand-filled carton test Stored at TAPPI conditions (73 deg. F., 50% humidity) Evaluated at 4 days | Good - No outside staining | Good - No outside staining | Good - No outside staining | Good - No outside Staining |

TABLE 15-continued

Masking of Packaging Materials Contacted with Various Dryer Sheets*

| Substrate | Dryer Sheet I | Dryer Sheet II | Dryer Sheet III | Dryer Sheet IV |
|---|---|---|---|---|
| Coating Formula 1 Stack test Stored at 120 F. Evaluated at 7 days | Good - No staining to print side; slight tack on print to print stack test | Poor - Heavy tack on print to print stack test* | Good - No staining to print side; slight tack on print to print stack test | Good - No staining to print side; slight tack on print to print stack test |

*Composition of dryer sheets unknown. However, commercial dryer sheets are known to be impregnated with fabric softener compositions. Such compositions are known to include one or more of: fatty alcohols, mineral oils, or organosilicone materials.

As set forth in the various Tables above, the substrates treated according to the methods and compositions and methods of the present invention effectively mask staining from grease, fat or oil permeation through a packaging material. Further, the appearance of the packaging material is equal to or better than packaging materials treated according to prior art methods and compositions including the now unavailable fluorochemical barrier treatments. Accordingly, these results demonstrate that the methods and compositions of the present invention provide a useful and valuable improvement to the field of packaging materials.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a packaging material, comprising:
providing a grease, fat and oil permeable substrate suitable for use as a packaging material, the substrate having an inner surface and an outer surface;
selecting a dark colored layer that is permeable to grease, fat and oil, the dark colored layer comprising a dark colorant-containing solution, the dark colorant-containing solution comprising
from about 0.05% to about 0.06% by weight of non-metallic black pigment,
from about 93% to about 95% by weight of water,
about 5% by weight of starch,
the dark colored layer not capable when applied by itself to the substrate of masking stains from grease, fat or oil applied to the inner surface of the substrate;
selecting a light colored layer that is permeable to grease, fat and oil, the light colored layer comprising a light colorant-containing solution, the light colorant-containing solution comprising
from about 28% to about 45% by weight of Kaolin Clay 1,
from about 17% to about 72% by weight of titanium dioxide,
from about 60% to about 65% by weight of non-metallic light colored pigment,
from about 2% to about 2.5% by weight of soy protein,
from about 30% to about 38% by weight of a latex binder,
the light colored layer not capable when applied by itself to the substrate of masking stains from grease, fat or oil applied to the inner surface of the substrate;
applying the dark colored layer on the substrate;
applying the light colored layer on the dark colored layer;
wherein said steps (b) and (c) each include the step of selecting a dark colored layer and selecting a light colored layer that, when applied according to steps (d) and (e), result in a structure that masks stains from grease, fat and oil applied to the inner surface of the substrate.

2. The method of claim 1, wherein the step of providing a grease, fat and oil permeable substrate suitable for use as a packaging material includes the step of selecting a grease, fat or oil permeable substrate that comprises paperboard, paper or fabric.

3. The method of claim 2, wherein the step of providing a grease, fat and oil permeable substrate suitable for use as a packaging material that comprises paperboard includes the step of selecting a paperboard that comprises one or more of: SBS, SUS or recycled paperboard.

4. The method of claim 1, wherein the step of providing a grease, fat and oil permeable substrate suitable for use as a packaging material includes the step of selecting a packaging material suitable for use in packaging human food, animal food, drugs or cosmetics.

5. The method of claim 1 further comprising the step of forming the packaging material into a wrap, pouch, bag, box, cup, tray, plate, can, tube or bottle, thereby forming an article.

6. The method of claim 1, further comprising the step of applying a printed layer adjacent to the outer surface of the light colored layer.

* * * * *

UNITED STATES PATENT AND TRADEMARK OFFICE
CERTIFICATE OF CORRECTION

PATENT NO. : 7,954,306 B2  
APPLICATION NO. : 12/409073  
DATED : June 7, 2011  
INVENTOR(S) : Robert J. Gould Page 1 of 1

It is certified that error appears in the above-identified patent and that said Letters Patent is hereby corrected as shown below:

Column 33, Line 42 (Claim 1, Line 2)  
Insert --a.-- immediately preceding the word *providing*

Column 33, Line 45 (Claim 1, Line 5)  
Insert --b.-- immediately preceding the word *selecting*

Column 33, Line 49 (Claim 1, Line 9)  
Insert --(i)-- immediately preceding the word *from*

Column 33, Line 51 (Claim 1, Line 11)  
Insert --(ii)-- immediately preceding the word *from*

Column 33, Line 52 (Claim 1, Line 12)  
Insert --(iii)-- immediately preceding the word *about*

Column 34, Line 13 (Claim 1, Line 16)  
Insert ---c.-- immediately preceding the word *selecting*

Column 34, Line 17 (Claim 1, Line 20)  
Insert --(i)-- immediately preceding the word *from*

Signed and Sealed this  
Twenty-eighth Day of February, 2012

David J. Kappos  
*Director of the United States Patent and Trademark Office*

UNITED STATES PATENT AND TRADEMARK OFFICE
CERTIFICATE OF CORRECTION

| | |
|---|---|
| PATENT NO. | : 7,954,306 B2 |
| APPLICATION NO. | : 12/409073 |
| DATED | : June 7, 2011 |
| INVENTOR(S) | : Robert J. Gould |

It is certified that error appears in the above-identified patent and that said Letters Patent is hereby corrected as shown below:

Column 33, Line 42 (Claim 1, Line 2)
Insert --a.-- immediately preceding the word *providing*

Column 33, Line 45 (Claim 1, Line 5)
Insert --b.-- immediately preceding the word *selecting*

Column 33, Line 49 (Claim 1, Line 9)
Insert --(i)-- immediately preceding the word *from*

Column 33, Line 51 (Claim 1, Line 11)
Insert --(ii)-- immediately preceding the word *from*

Column 33, Line 52 (Claim 1, Line 12)
Insert --(iii)-- immediately preceding the word *about*

Column 34, Line 13 (Claim 1, Line 16)
Insert --c.-- immediately preceding the word *selecting*

Column 34, Line 17 (Claim 1, Line 20)
Insert --(i)-- immediately preceding the word *from*

Column 34, Line 18 (Claim 1, Line 21)
Insert --(ii)-- immediately preceding the word *from*

Column 34, Line 20 (Claim 1, Line 23)
Insert --(iii)-- immediately preceding the word *from*

This certificate supersedes the Certificate of Correction issued February 28, 2012.

Signed and Sealed this
First Day of May, 2012

David J. Kappos
*Director of the United States Patent and Trademark Office*

CERTIFICATE OF CORRECTION (continued)
U.S. Pat. No. 7,954,306 B2

Column 34, Line 22 (Claim 1, Line 25)
Insert --(iv)-- immediately preceding the word *from*

Column 34, Line 23 (Claim 1, Line 26)
Insert --(v)-- immediately preceding the word *from*

Column 34, Line 27 (Claim 1, Line 30)
Insert --d.-- immediately preceding the word *applying*

Column 34, Line 28 (Claim 1, Line 31)
Insert --e.-- immediately preceding the word *applying*

Column 34, Line 29 (Claim 1, Line 32)
Insert --f.-- immediately preceding the word *wherein*